Oct. 9, 1956 — L. M. PUSTER — 2,765,984
TEMPERATURE REGULATOR
Filed July 1, 1953 — 2 Sheets-Sheet 1

INVENTOR.
Louis M. Puster.
BY
HIS ATTORNEY

Oct. 9, 1956     L. M. PUSTER     2,765,984
TEMPERATURE REGULATOR

Filed July 1, 1953     2 Sheets-Sheet 2

INVENTOR.
Louis M. Puster.
BY
HIS ATTORNEY

United States Patent Office 2,765,984
Patented Oct. 9, 1956

2,765,984

TEMPERATURE REGULATOR

Louis M. Puster, Knoxville, Tenn., assignor to Robertshaw-Fulton Controls Company, Greensburg, Pa., a corporation of Delaware Application July 1, 1953, Serial No. 365,330

8 Claims. (Cl. 236—34)

This invention relates to temperature regulators and more particularly to temperature regulators of the type employed for controlling the circulation of a cooling medium through a conduit and utilizing a butterfly-type valve element.

It is an object of this invention to simplify the adjustment of a butterfly-type thermostatic valve for setting the temperature at which the valve will open.

Another object of this invention is to preclude binding of a pivoted valve member by preventing direct application of biasing forces to such member except in the closed position thereof.

When springs are used to bias a butterfly valve closed, the forces exerted by the springs increase as the valve is moved against the bias. It is an object of this invention to compensate for such increased spring loads by positioning the butterfly valve actuating device and springs in such relation to each other that the moment applied by the springs decreases rapidly as the valve is opened despite increased biasing forces accompanying such valve movement.

With these and other objects in view, a valve embodying this invention comprises a housing having a ported wall for receiving a butterfly valve element. An operating lever is pivoted on the same axis as the valve element and is connected to the valve element by a screw threaded into the same. The screw has a lost motion connection with the lever and, when rotated, will adjust the angular relation between the lever and the valve element. Thermally responsive means actuates the lever so that the screw serves to adjust the temperature at which the valve element moves from the valve seat and springs, acting between the lever and the valve housing, bias the lever to a position wherein the valve element closes the ported wall.

Other objects and advantages will appear from the following description taken in connection with the accompanying drawings wherein.

Figure 1:
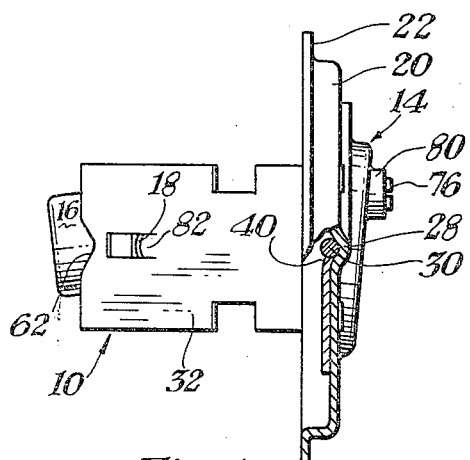
Fig. 1 is a side elevation of a thermostatic valve embodying this invention with a portion thereof broken away.

Referring more particularly to the drawings, the temperature regulator shown comprises a single self-contained unit that may be readily installed in any suitable conduit, such as a portion of an automobile cooling system or the like. To this end, the regulator includes a housing 10 having an apertured wall at one end thereof. A butterfly-type valve element 14 is pivotally mounted in the housing 10 to control fluid flow through the apertured wall in a manner well known in the art. A thermally responsive device 16 is provided for moving the valve element 14 about its pivot and this device operates in opposition to the bias of a pair of springs 18 which tend to hold the valve element 14 in closed position.

The housing 10 includes a plate 20 which is flanged at its peripheral portion 22 for mounting purposes. The plate 20 is provided with a centrally disposed aperture or valve port 24 which is divided into two halves by a pair of diametrically opposed aligned slots 26 formed in the edges of the plate 20 which define the valve port 24.

Those portions of the plate 20 immediately adjacent the slots 26 are crimped to form a pair of semi-cylindrical bosses 28. The undersides of the bosses 28 define a pair of aligned dwells which respectively receive the ends of a shaft 30. The shaft 30 extends across the aperture 24 and is held securely in position against the plate 20 by a generally U-shaped strap 32. The ends of the strap 32 abut the shaft 30 and are held against the same by a plurality, in this instance, four tabs 34 formed on the strap 32 and extending through the plate 20. The ends of the tabs 34 are staked to secure the plate 20 and strap 32 together as a unit which comprises the housing 10.

The valve element 14 comprises two laterally offset planar wing portions 36, 38 which are connected by intermediate or junction sections 40 at opposite ends thereof and by an outwardly raised central section 42. The section 42 has a transition wall 44 blended into the wing portion 36 and a transition wall 46 blended into the offset wing portion 38. When disposed in operating position within the valve port 24, the junction sections 40 lie partially within the slots 26 of the plate 20.

Figure 2:
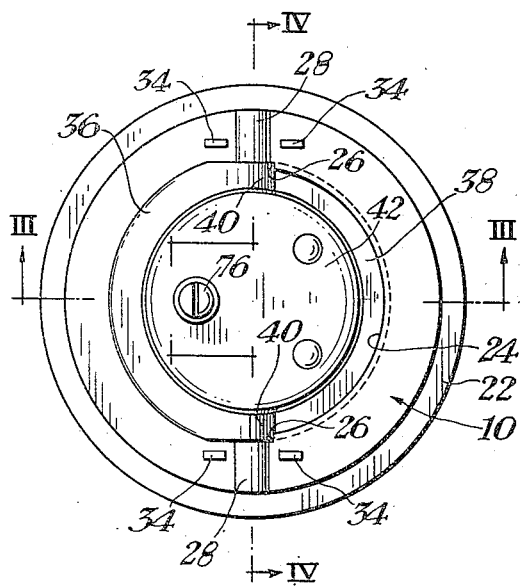
Fig. 2 is a plan view of the valve shown in Fig. 1.

The valve element 14 is of generally circular form. The wing portion 36 is of a diameter to completely overlie that half of the valve port 24 disposed to the left of the center line, as viewed in Figs. 2 and 3. The wing portion 38 is of a diameter to completely underlie and thus close, from the underside, that portion of the valve port 24 which lies to the right of the center line, as viewed in Figs. 2 and 3. Thus, the peripheral portion of the valve element 14 extends beyond the edges of the valve port 24 and engages the plate 20 in fluid sealing relation therewith when the valve element is in the position shown in Figs. 1–4.

Secured to the underside of the central section 42 of the valve element 14 is a plate 48 which is provided with a pair of spaced, downwardly projecting lugs 50. Each lug 50 is provided with an elongated aperture 52 which loosely receives the shaft 30. The apertured lugs 50 and shaft 30 provide a loose pivotal mounting for the valve element 14 which is thus free for limited movement laterally of the shaft 30. Consequently, the valve element 14 floats freely on the shaft 30 when it is in the open position and is free to adjust itself laterally of the shaft 30 as it moves into the closed position and makes contact with the plate 20.

Opening and closing of the valve element 14 is effected by means of the thermally responsive device 16 which comprises a casing 54, a piston 56 slidable in the casing 54, and an expansible substance (not shown) disposed within the casing 54. The expansible substance within the casing 54 will expand or contract in response to temperature changes and, upon expansion, will impart a thrust to the piston 56 tending to move the same out of the casing 54.

The lower end of the casing 54 extends through an opening 58 formed in the bight portion of the U-shaped strap 32. Passage of the casing 54 through the opening 58 is prevented by a collar 60 formed on the casing 54 and arranged to abut a pair of bosses 62 formed in the bight portion of the strap 32 adjacent the opening 58.

The collar 60 makes line contact with the bosses 62 so that a rocking or pivotal support is provided for the casing 54. The end of the piston 56 which extends out of the casing 54 is pivotally connected to an operating lever 64.

Figure 4:
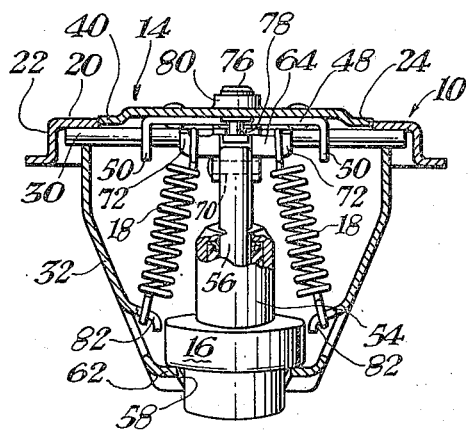
Fig. 4 is a sectional view taken on the line IV—IV of Fig. 2 and rotated through 90° relative to Fig. 1.
Figure 5:
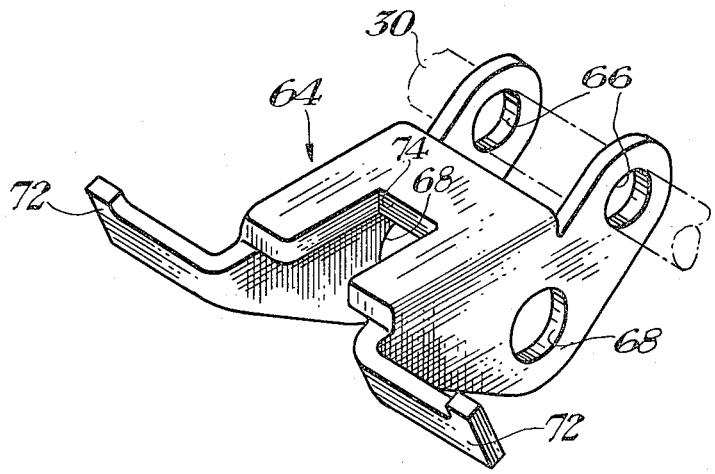
Fig. 5 is a perspective view of a detail shown on an enlarged scale.

As best shown in Figs. 4 and 5, the lever 64 is a generally U-shaped member having a first pair of aligned apertures 66 and adjacent one end thereof. The apertures 66 loosely receive the shaft 30 to provide a pivotal mounting for the lever 64 permitting movement thereof about substantially the same axis as the valve element 14.

Located in a depending medial portion of the lever 64 is a second pair of aligned apertures 68 which are adapted to receive a rivet 70 passing through the piston 56 of the thermally responsive device 16 and providing the desired pivotal connection between the piston 56 and the lever 64. The ends of the operating lever 64 opposite the apertures 66 are bent outward to form a pair of hooks 72 which are adapted to be connected to the springs 18.

The bight portion of the U-shaped lever 64 is notched at 74 to loosely receive the shank portion 78 of a screw 76. The shank portion 78 is of smaller diameter than the ends of the screw 76 and the length of the shank portion 78 is slightly longer than the thickness of the material of the lever 64 measured at the edges of the notch 74. The screw 76 is thus free to move axially relative to the lever 64 through a limited distance and a lost motion connection is effected. The screw 76 is threaded into a suitable apertured boss 80 formed in the central section 42 of the valve element 14, thereby to provide a connection between the operating lever 64 and the valve element 14 for transmitting movement therebetween.

Disposed on opposite sides of the thermally responsive device 16 are two tabs 82 which are suitably formed as by being punched out of the strap 32 and bent inwardly toward the casing 54 of the thermally responsive device 16. The springs 18 are respectively connected at their one ends to the hooks 72 of the operating lever 64 and are respectively secured at their other ends to the tabs 82. The springs 18 are preferably of the coil type and are in tension when connected as shown in the drawings so that the operating lever 64 is biased in a counterclockwise direction as viewed in Figs. 3 and 6.

Figure 3:
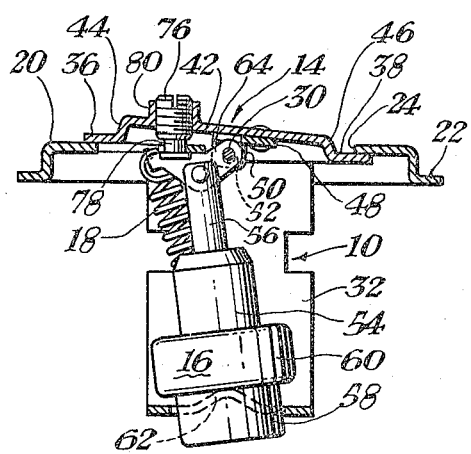
Fig. 3 is a sectional view taken on the line III—III of Fig. 2 and rotated through 90° relative to Fig. 1.

The aligned bosses 62 which form a pivotal support for the thermally responsive device 16 are disposed in a plane which also contains the shaft 30 of the valve element 14. The tabs 82 are also disposed within this plane and are positioned between the bosses 62 and the shaft 30. Since the piston 56 of the thermally responsive device 16 is connected to a depending medial portion of the operating lever 64, the axis of the piston 56 will extend through the plane which contains the axes of the springs 18 when the valve element 14 is in the closed position as shown in Fig. 3. With this arrangement, the lines of action of the forces exerted by the springs 18 will move toward the pivot 30 more rapidly than does the line of action of the force exerted by the piston 56 as the valve element 14 moves toward the open position.

Thus, the increased spring forces due to elongation of the springs 18 as the valve element 14 moves to the open position will cause little or no increased load upon the thermally responsive device 16 due to the fact that the valve opening movement decreases the moment arms of these forces as the forces increase and the total moment produced by the springs is decreased. Accordingly, a high initial load for seating the valve element 14 can be used without exceeding the maximum load for the thermally responsive device 16 with the valve in its wide open position.

It is also to be noted that since the piston 56 of the thermally responsive device 16 is connected to a depending medial portion of the operating lever 64, initial extension of the piston 56 will in fact increase the moment arm of the force exerted by the piston 56 to increase the operating moment and further increase the compensation for additional bias resulting from elongation of the springs 18.

The operation of the device is as follows: Assuming that the apparatus is in the condition shown in Figs. 1 through 4 with the valve element 14 seated on the plate 20 to prevent fluid flow through the valve port 24 and the ambient temperature to which the thermally responsive device 16 is subjected is increased, the piston 56 will move out of the casing 54 and rotate the operating lever 64 against the bias of the springs 18. After the lever 64 moves through a distance sufficient to take up the lost motion between the same and the screw 76, the valve element 14 will be carried along with the operating lever 64, pivoting about the shaft 30 and moving out of fluid sealing relation with the plate 20. It is to be noted that in the open position of the valve element 14, the bias of the springs 18 is transmitted directly to the piston 56 through the operating lever 64, the valve element 14 being effectively isolated from such bias by the lost motion connection between the screw 76 and the operating lever 64. Thus, the valve element 14 is free to float upon the shaft 30 and the possibility of the valve element binding on the shaft has been eliminated.

Figure 6:
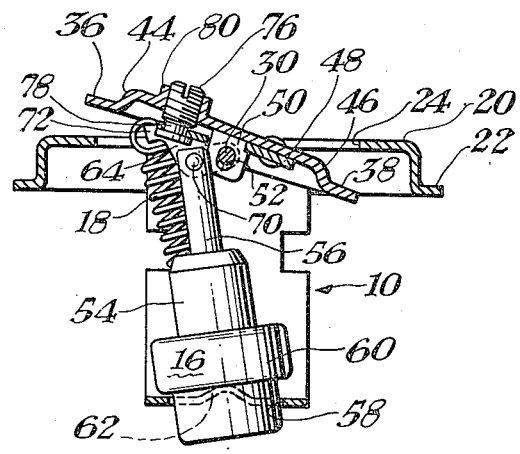
Fig. 6 is a view corresponding to Fig. 3 with the parts of the valve in different operating positions.

Upon cooling of the thermally responsive device 16, the thrust exerted on the piston 56 is relieved, permitting the springs 18 to move the operating lever 64 in a counterclockwise direction as viewed in Figs. 3 and 6 and force the piston 56 into the casing 54 of the thermally responsive device 16. As the operating lever 64 so moves, the valve element 14 is brought into engagement with the plate 20. Upon making contact with the plate 20, the valve element 14 will shift relative to the shaft 30 and operating lever 64 to effect a uniform seating contact with the plate 20. This shifting is permitted by the lost motion connection between the adjusting screw 76 and the operating lever 64 as well as the loose connection between the valve element 14 and the shaft 30.

Further counterclockwise movement of the operating lever 64 will take up the lost motion between the same and the adjusting screw 76 to cause the bias of the springs 18 to be applied directly to the valve element 14. Thus, the full load of the springs 18 is now used to assure positive seating of the valve element. However, it is to be noted that almost none of this load was required to force parts of the valve element 14 into seating position.

To calibrate the disclosed valve, the thermally responsive device 16 is placed in a bath of liquid maintained at the temperature at which the valve element 14 should open. After the thermally responsive device 16 has been heated by the bath, the adjusting screw 76 is manipulated to vary the angular relation between the valve element 14 and the operating lever 64 so that the valve element 14 begins to open at a temperature approximating that of the bath. Thus, a simple mechanism is provided for accurately calibrating the valve.

While the embodiment of the invention illustrated in the drawings has been specifically described in detail, it is to be expressly understood that the invention is not restricted thereto, as other embodiments will become apparent to those skilled in the art and changes may be made in the details of construction, arrangement, and proportions without departing from the scope of this invention. Accordingly, reference is to be had to the appended claims for definition of the invention.

I claim:

1. A valve mechanism comprising a housing having a wall with a port therethrough, a rigid operating element pivotally mounted on said housing and biased in one direction, thermally responsive means pivotally mounted on said housing and including a movable member operatively connected to said element for moving the same against said bias, a valve element pivotally mounted on said housing for movement between a plurality of positions to control fluid flow through said port, and means operatively connecting said operating element to said valve element for moving said valve element between said positions.

2. A valve mechanism as claimed in claim 1 wherein said connecting means is adjustable to vary the angular relation between said operating element and said valve element thereby to set the temperature at which said thermally responsive means will actuate said valve element.

3. A valve mechanism as claimed in claim 2 wherein said connecting means includes a rotatable threaded member engaging said operating element and said valve element.

4. A valve mechanism comprising a housing having a wall with a port therethrough, a rigid operating element pivotally mounted on said housing and biased in one direction, thermally responsive means pivotally mounted on said housing and including a movable member operatively connected to said element for moving the same against said bias, a valve element pivotally mounted on said housing for movement between a plurality of positions to control fluid flow through said port, and a threaded member extending between said valve element and said operating element, said member being threaded into one of said elements and having a lost motion connection with the other of said elements.

5. A valve mechanism comprising in combination: a housing having a wall with a port therethrough; means for controlling fluid flow through said port, said means including a movable element, and a pivot for said element; at least one spring having a connection at one end with said element laterally of said pivot; connecting means for securing the other end of said spring to said housing; condition responsive means having a movable member connected to said element between said spring connection and said pivot; and a pivotal support on said housing for said last named means; said connecting means, support, and pivot lying in substantially the same plane with said connecting means disposed between said support and pivot.

6. In a thermostatic valve having a ported valve seat, a butterfly valve member for controlling fluid flow through said ported seat, and a pivot for said valve member, the combination of a housing operatively associated with said valve seat and having a seating portion, thermally responsive means including a casing pivotally rockable on said seating portion and a member movable in and out of said casing in responsive to temperature variations, a pivotal driving connection between said movable member and said valve member to angularly position said valve member relative to said valve seat, at least one spring having a connection at one end with said valve member, said pivot driving connection being positioned between said spring connection and said pivot, and means for connecting the other end of said spring to said housing at a point lying substantially within a plane common to said pivot and said seating portion.

7. A thermostatic valve as claimed in claim 6 wherein said points are disposed between said seating portion and said pivot.

8. A valve mechanism comprising a housing having a wall with a port therethrough, a shaft supported on said housing and extending across said port, an operating element mounted on said shaft for pivotal movement thereon and biased in one direction, a valve element loosely mounted on said shaft for pivotal movement between a plurality of positions thereon and limited lateral movement relative thereto, a threaded member extending between said valve element and said operating element for moving said valve element between said positions, said member being threaded into one of said elements and having a lost motion connection with the other of said elements.

References Cited in the file of this patent

UNITED STATES PATENTS

| | | |
|---|---|---|
| 547,228 | Radley | Oct. 1, 1895 |
| 627,390 | Cash | June 20, 1899 |
| 1,607,745 | Palm | Nov. 23, 1926 |
| 2,368,120 | Downey | Jan. 30, 1945 |
| 2,376,513 | Shaffer | May 22, 1945 |
| 2,612,338 | Flosdorf | Sept. 30, 1952 |

FOREIGN PATENTS

| | | |
|---|---|---|
| 652,635 | Great Britain | Apr. 25, 1951 |